United States Patent
Calandro et al.

(10) Patent No.: US 11,595,902 B2
(45) Date of Patent: Feb. 28, 2023

(54) ELECTRONIC DEVICE FOR FILTERING PACKET AND METHOD FOR OPERATING SAME

(71) Applicant: Samsung Electronics Co., Ltd., Gyeonggi-do (KR)

(72) Inventors: Marc Calandro, Gyeonggi-do (KR); Danish Ehsan Hashmi, Bangalore (IN); Rohit Shankarlingappa, Bangalore (IN); Ramanathan Palaniappan, Bangalore (IN); Ramesh Chandra Vuppala, Bangalore (IN); Yongsoo Kwon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 17/274,495

(22) PCT Filed: Sep. 16, 2019

(86) PCT No.: PCT/KR2019/011931
§ 371 (c)(1),
(2) Date: Mar. 9, 2021

(87) PCT Pub. No.: WO2020/060124
PCT Pub. Date: Mar. 26, 2020

(65) Prior Publication Data
US 2022/0053425 A1    Feb. 17, 2022

(30) Foreign Application Priority Data

Sep. 19, 2018  (KR) ........................ 10-2018-0112463

(51) Int. Cl.
*H04W 52/02*    (2009.01)
*H04L 47/2475*    (2022.01)
*H04L 67/63*    (2022.01)

(52) U.S. Cl.
CPC ..... *H04W 52/0264* (2013.01); *H04L 47/2475* (2013.01); *H04L 67/63* (2022.05)

(58) Field of Classification Search
None
See application file for complete search history.

(56) References Cited

U.S. PATENT DOCUMENTS

| 6,792,600 B1 * | 9/2004 | Blandy | H04B 3/487 717/136 |
| 7,913,294 B1 | 3/2011 | Maufer et al. | |

(Continued)

FOREIGN PATENT DOCUMENTS

| CN | 101873640 A | 10/2010 |
| KR | 10-2011-0092005 A | 8/2011 |

(Continued)

*Primary Examiner* — Lonnie V Sweet
(74) *Attorney, Agent, or Firm* — Cha & Reiter, LLC

(57) ABSTRACT

According to various embodiments, an electronic device comprises a communication processor, an application processor operatively connected to the communication processor, and a memory, wherein the at least one memory may store instructions configured to, when executed, cause the application processor to identify a user identifier (UID) corresponding to at least one allowed application or at least one disallowed application when the electronic device enters a power saving state and to generate, on the basis of the user identifier, a first packet filter program which includes at least one condition for filtering a packet, and cause the communication processor to identify the first packet filter program generated from the application processor and to filter at least one packet associated with an application other than the at least one allowed application or at least one packet associated with the at least one disallowed application by using the first packet filter program, while the electronic device is in the power saving state. Various other embodiments are possible.

15 Claims, 8 Drawing Sheets

(56) References Cited

U.S. PATENT DOCUMENTS

| | | | |
|---|---|---|---|
| 9,648,564 B1* | 5/2017 | Cui | H04W 52/0222 |
| 2004/0205247 A1 | 10/2004 | Ahn | |
| 2005/0005165 A1* | 1/2005 | Morgan | H04L 63/029 |
| | | | 726/4 |
| 2006/0143699 A1 | 6/2006 | Nagata et al. | |
| 2007/0067445 A1* | 3/2007 | Vugenfirer | H04L 67/141 |
| | | | 709/224 |
| 2008/0049679 A1 | 2/2008 | Suh et al. | |
| 2009/0125632 A1* | 5/2009 | Purpura | H04L 67/535 |
| | | | 709/229 |
| 2011/0016519 A1 | 1/2011 | Sauter et al. | |
| 2011/0194474 A1 | 8/2011 | Kim et al. | |
| 2011/0249564 A1 | 10/2011 | Cho | |
| 2015/0373644 A1* | 12/2015 | Sathy | H04W 52/0222 |
| | | | 370/311 |
| 2016/0219083 A1* | 7/2016 | Gangadharan | H04L 67/145 |
| 2017/0019858 A1* | 1/2017 | Zhao | H04W 52/0216 |

FOREIGN PATENT DOCUMENTS

| | | |
|---|---|---|
| KR | 10-2012-0090934 A | 8/2012 |
| KR | 10-1661161 B1 | 10/2016 |

* cited by examiner

ELECTRONIC DEVICE FOR FILTERING PACKET AND METHOD FOR OPERATING SAME

CROSS-REFERENCE TO RELATED APPLICATION(S)

This application is a National Phase Entry of PCT International Application No. PCT/KR2019/011931, which was filed on Sep. 16, 2019 and claims priority to Korean Patent Application No. 10-2018-0112463, which was filed on Sep. 19, 2018 in the Korean Intellectual Property Office, the contents of which are incorporated herein by reference.

1. FIELD

Various embodiments relate to an electronic device which filters a packet by using a communication processor in a power saving state and an operating method of the electronic device.

2. DESCRIPTION OF THE RELATED ART

An electronic device, while performing data communication with another electronic device, may evaluate or analyze a packet transmitted and received during the data communication by using a packet filter program. The electronic device may allow or block the flow of various types of Internet protocol (IP) packets through packet filtering. Packet filtering may be applied to incoming and outgoing IP flow traffic. Packet filtering may define permission to receive particular inbound IP traffic or to transmit a particular IP traffic through one or more interfaces. For packet filtering, 5-tuple of an IP packet (a source IP address, a destination IP address, a protocol identifier, a source port number, and a destination port number) may be used.

SUMMARY

When packet filtering is performed in an application processor and an undesired packet is received in a power saving state, an application processor may unnecessarily switch to a wakeup state to perform packet filtering.

When the electronic device performs packet filtering merely using a source address or a destination address of the packet, it may not be easy to perform packet filtering separately for each application.

Various embodiments may provide an electronic device and an operating method thereof, in which in a power saving state, a packet filter program including a condition for filtering a packet based on a user identifier corresponding to an allowed application is generated and a packet associated with an application other than the allowed application is filtered.

According to various embodiments, an electronic device includes a communication processor, an application processor operatively connected with the communication processor, and at least one memory, in which the at least one memory stores instructions configured to, when executed, cause the application processor to identify a user identifier (UID) corresponding to at least one allowed application or at least one disallowed application when the electronic device enters a power saving state and to generate a first packet filter program including at least one condition for filtering a packet, based on the user identifier, and the at least one memory stores instructions configured to, when executed, cause the communication processor to identify the first packet filter program generated from the application processor and to filter at least one packet associated with an application other than the at least one allowed application or at least one packet associated with the at least one disallowed application by using the first packet filter program, when the electronic device is in the power saving state.

According to various embodiments, an operation method of an electronic device which filters a packet includes identifying, by an application processor, a user identifier (UID) corresponding to at least one allowed application or at least one disallowed application when the electronic device enters a power saving state, generating, by the application processor, a first packet filter program including at least one condition for filtering a packet, based on the user identifier, identifying, by the communication processor, the first packet filter program generated from the application processor, and filtering, by the communication processor, at least one packet associated with an application other than the at least one allowed application or at least one packet associated with the at least one disallowed application, by using the first packet filter program, when the electronic device is in the power saving state.

According to various embodiments, in a computer-readable recording medium having recorded thereon a program for executing an operation method of an electronic device including a communication processor, an application processor operatively connected with the communication processor, and a memory, the operation method includes identifying, by an application processor, a user identifier (UID) corresponding to at least one allowed application or at least one disallowed application when the electronic device enters a power saving state, generating, by the application processor, a first packet filter program including at least one condition for filtering a packet, based on the user identifier, identifying, by the communication processor, the first packet filter program generated from the application processor, and filtering, by the communication processor, at least one packet associated with an application other than the at least one allowed application or at least one packet associated with the at least one disallowed application, by using the first packet filter program, when the electronic device is in the power saving state.

According to various embodiments, an electronic device in a power saving state filters an inbound packet through a communication processor, thereby minimizing power consumption of an application processor.

According to various embodiments, by using a user identifier capable of identifying an application, packet filtering may be performed for each application.

DETAILED DESCRIPTION

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure.

Figure 1:
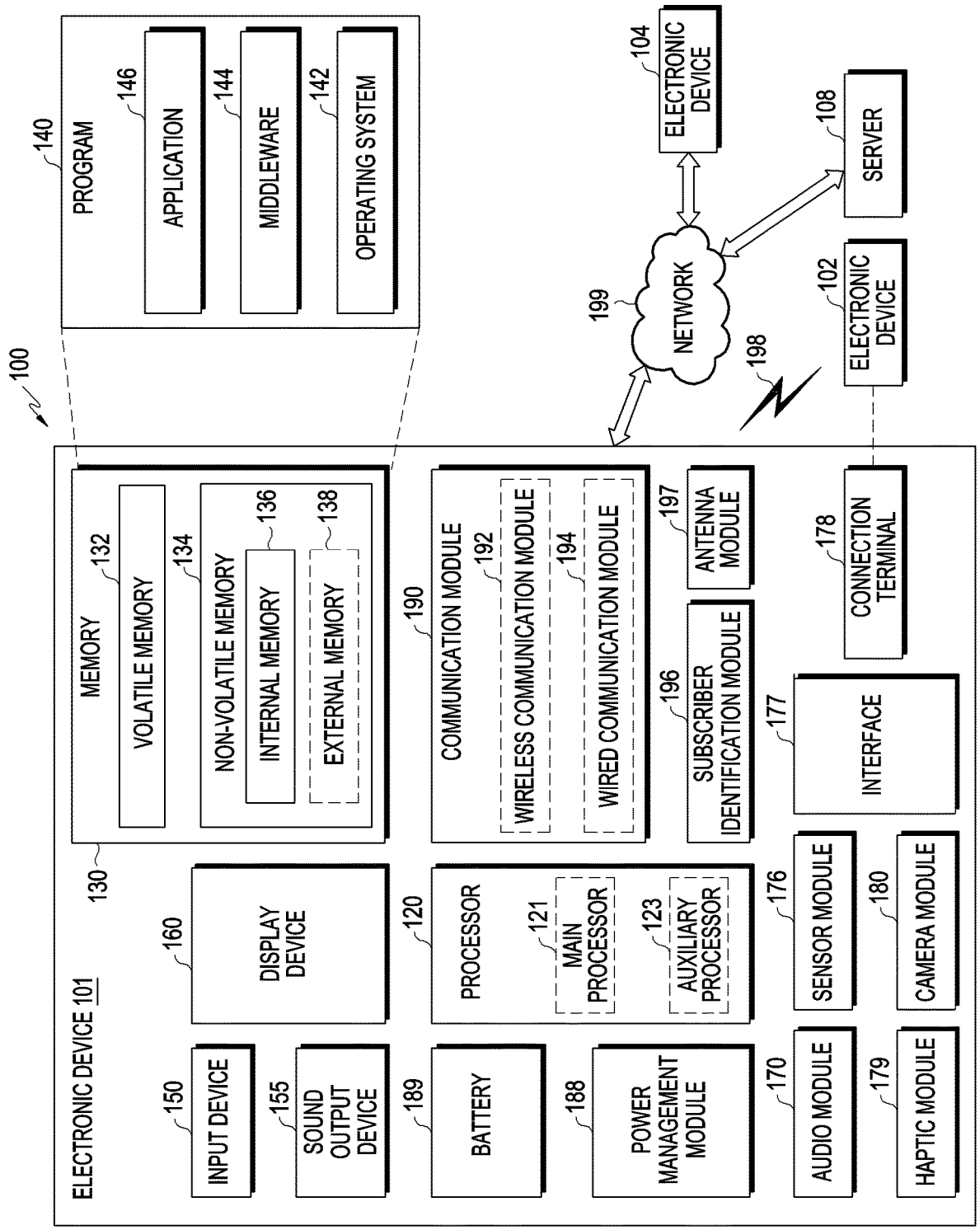
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication circuit 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication circuit 190) in volatile memory 132, process the command or the data stored in the volatile memory 132, and store resulting data in non-volatile memory 134. According to an embodiment, the processor 120 may include an application processor 121 (e.g., a central processing unit (CPU)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the application processor 121, or to be specific to a specified function. The auxiliary processor 123 may be implemented as separate from, or as part of the application processor 121.

The auxiliary processor 123 may control at least some of functions or states related to at least one component (e.g., the display device 160, the sensor module 176, or the communication circuit 190) among the components of the electronic device 101, instead of the application processor 121 while the application processor 121 is in an inactive (e.g., sleep) state, or together with the application processor 121 while the application processor 121 is in an active state (e.g., executing an application). According to an embodiment, the auxiliary processor 123 (e.g., an image signal processor or a communication processor) may be implemented as part of another component (e.g., the camera module 180 or the communication circuit 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The memory 130 may include a program storage region to be driven in the application processor 121 and a program storage region to be driven in a communication processor (e.g., the auxiliary processor 123 or the communication processor 191).

The program 140 may be stored in the memory 130 as software, and may include, for example, an operating system (OS) 142, middleware 144, or an application 146. The program 140 may include a program to be driven in the application processor 121 and a program to be driven in a communication processor (e.g., the auxiliary processor 123 or the communication processor 191).

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication circuit 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication circuit 190 may include one or more communication processors 191 that are operable independently from the processor 120 (e.g., the application processor (AP)) and supports a direct (e.g., wired) communication or a wireless communication. According to an embodiment, the communication circuit 190 may include a wireless communication circuit 192 (e.g., a cellular communication circuit, a short-range wireless communication circuit, or a global navigation satellite system (GNSS) communication circuit) or a wired communication circuit 194 (e.g., a local area network (LAN) communication circuit or a power line communication circuit). A corresponding one of these communication circuits may communicate with the external electronic device via the first network 198 (e.g., a short-range communication network, such as Bluetooth, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication circuits may be implemented as a single component (e.g., a single chip), or may be implemented as multi components (e.g., multi chips) separate from each other. The wireless communication circuit 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication circuit 190. The signal or the power may then be transmitted or received between the communication circuit 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
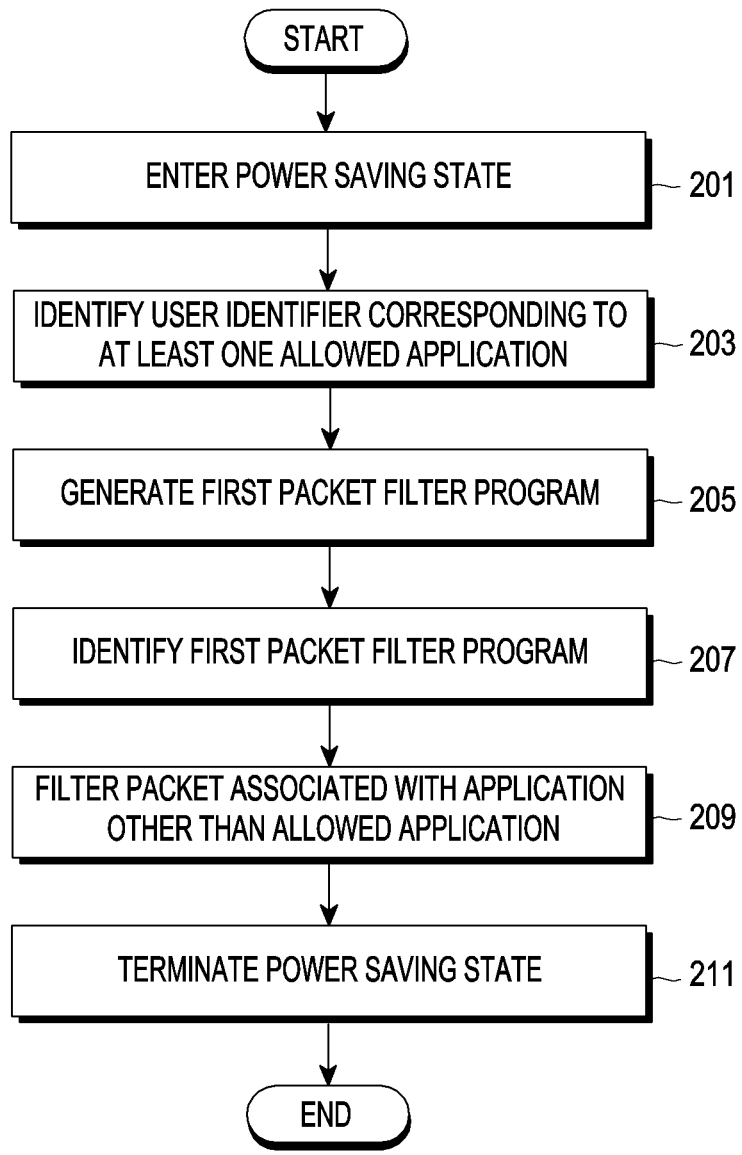
FIG. 2 is a flowchart for describing a method, performed by an electronic device, of filtering a packet, according to various embodiments.

FIG. 2 is a flowchart for describing a method, performed by the electronic device 101, of filtering a packet, according to various embodiments.

Figure 3:
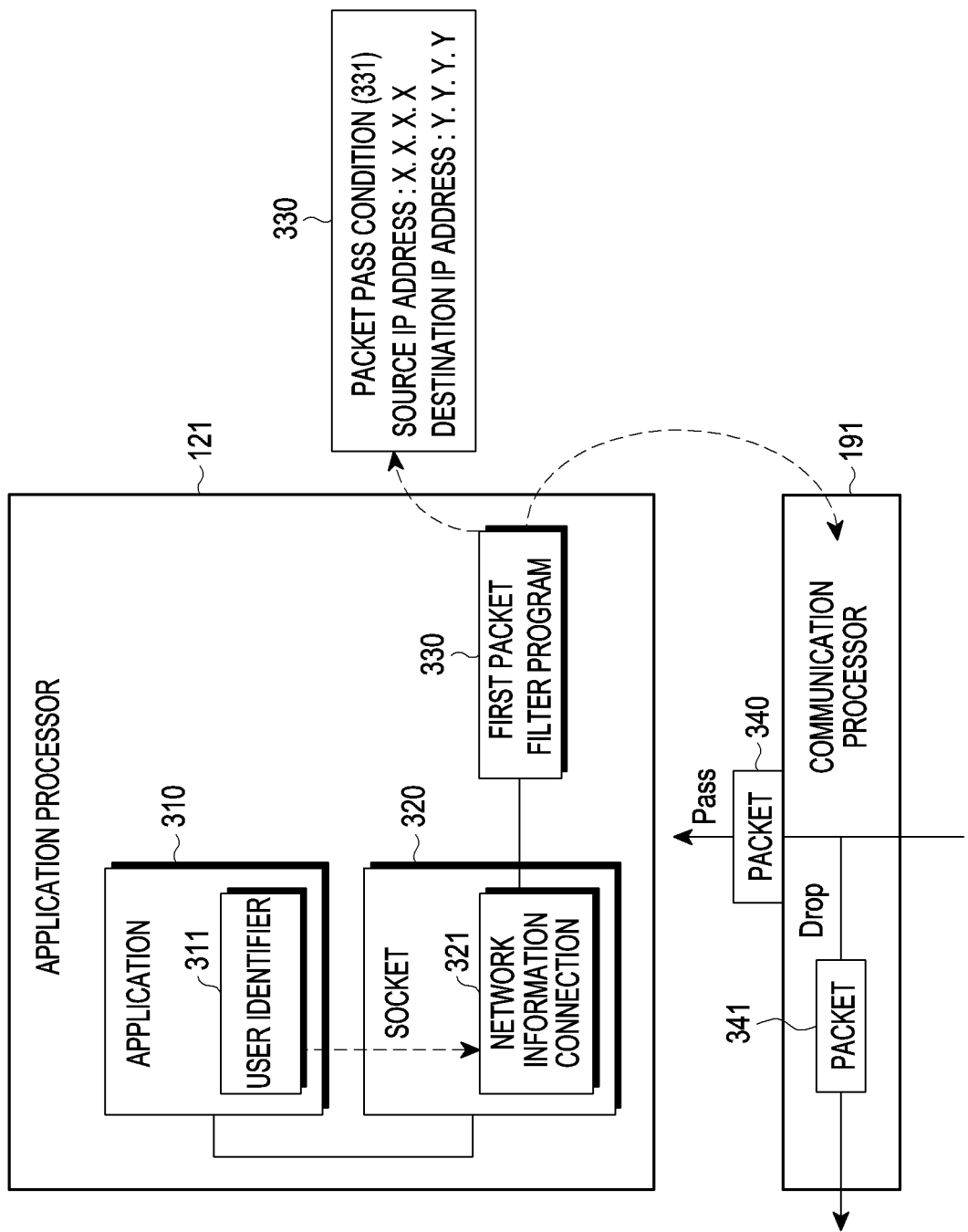
FIG. 3 is a view for describing an example in which an electronic device filters a packet by using a packet filter program, according to various embodiments.

FIG. 3 is a view for describing an example in which the electronic device 101 filters a packet by using a packet filter program, according to various embodiments.

Referring to FIGS. 2 and 3, in operation 201, according to various embodiments, the electronic device 101 (e.g., the application processor 121 of FIG. 1) may enter the power saving state. According to various embodiments, the electronic device 101 may enter a doze state corresponding to the power saving state. The doze state is a state in which a series of limitations are applied to an application to save a battery, and in the doze state, applications may a partially limited access to the application processor 121. According to various embodiments, when the electronic device 101 enters the doze state, the electronic device 101 may not perform a designated operation. For example, when the electronic device 101 enters the doze state, the electronic device 101 may not perform at least one of an operation of scanning Wi-Fi, an operation of executing Sync Adapter, an operation of executing Scheduler, an operation of processing Scheduler, or an operation of outputting a screen to a display. For convenience of a description, the power saving state may be referred to as the doze state, but there is no limitation on terms.

According to various embodiments, the electronic device 101 may enter the doze state when a designated condition is satisfied. When the electronic device 101 is in at least one of a non-charging state, a state of entering screen off due to manipulation of a power key of a user, a state of being in a screen-off state for a preset time, or a state of motion of the electronic device 101 being unidentified for a preset time, as the preset condition, the electronic device 101 may enter the doze state. The foregoing example of the electronic device 101 entering the doze state is merely an embodiment, without limiting the disclosure, and an example of the electronic device 101 entering the doze state known by those of ordinary skill in the art may also be included.

In operation 203, according to various embodiments, when the electronic device 101 (e.g., the application processor 121 of FIG. 1) enters the power saving state (e.g., the doze state), the electronic device 101 may identify a user identifier (UID) 311 corresponding to at least one allowed application 310 (or an application included in a white list). For example, as shown in FIG. 3, when the electronic device 101 enters the power saving state, the application processor 121 of the electronic device 101 may identify the user identifier 311 corresponding to the allowed application 310. Each application may have a user identifier corresponding thereto to identify the application.

According to various embodiments, the allowed application 310 may include a pre-designated application to perform data communication in the power saving state. For example, the electronic device 101 may determine an application previously designated by a system, such as an application using a push application (e.g., an application used in a push server of Google, an application using a Google cloud message (GCM), or an application used in a push server of Samsung), as the allowed application 310, or determine an application previously designated by a user as the allowed application 310. In another example, the allowed application 310 may include an application being in data communication in the power saving state. For example, when the electronic device 101 executing a music application enters the power saving state, the electronic device 101 may determine the music application as the allowed application 310.

According to various embodiments, when the electronic device 101 (e.g., the application processor 121 of FIG. 1) enters the power saving state, the electronic device 101 may identify a user identifier corresponding to at least one disallowed application (or an application included in a white list). The disallowed application according to various embodiments may include a pre-designated application to prohibit data communication in the power saving state. For example, the electronic device 101 may determine the application previously designated by the system as the disallowed application or may determine the application previously designated by the user as the disallowed application 310. In another example, the disallowed application may include an application which has not executed data communication at the time of entry to the power saving state. For example, when a web browser application is not in data communication at the time of the electronic device 101 entering the power saving state, the electronic device 101 may determine the web browser application as the disallowed application.

In operation 205, according to various embodiments, the electronic device 101 (e.g., the application processor 121 of FIG. 1) may generate a first packet filter program 330 including at least one condition for filtering packets 340 and 341 based on the user identifier 311. According to various embodiments, the application processor 121 may identify network connection information 321 associated with the user identifier 311 from a socket 320 corresponding to the at least one allowed application 310 to generate the first packet filter program 330. According to various embodiments, the application processor 121 may identify network connection information associated with a user identifier corresponding to the disallowed application from a socket corresponding to at least one disallowed application to generate the first packet filter program 330. The network connection information 321 may include at least one of an IP version, an IP source address, an IP destination address, a protocol, a network connection state, a transmission control protocol (TCP) source port, a TCP destination port, or a hash value identifying network connection. According to various embodiments, the application processor 121 may generate the first packet filter program 330 by using the network connection information 321. When the packets 340 and 341 inbound from the auxiliary processor 123 or the communication processor 191 includes at least one designated information of network connection information, the first packet filter program 330 may include a condition for passing or a condition for dropping the inbound packets 340 and 341 to transfer the inbound packets 340 and 341 to the application processor 121. For example, as shown in FIG. 3, when the application 310 is determined as the allowed application 310 in the power saving state, the electronic device 101 may identify a value of the user identifier 311 corresponding to the application 310 and generate the first packet filter program 330 including a condition for passing the packet 340 including designated information of network connection information associated with the user identifier 311, e.g., source IP address information (e.g., x.x.x.x) and destination IP address information (e.g., y.y.y.y). In another example, when the application is determined as the disallowed application in the power saving state, the electronic device 101 may identify a value of the user identifier corresponding to the disallowed application and generate the first packet filter program 330 including a condition for dropping the packet including designated information of network connection information associated with the user identifier, e.g., source IP address information and destination IP address information.

When a packet or data includes designated user identifier information, the electronic device 101 (e.g., the application processor 121 of FIG. 1) according to various embodiments may generate a first packet filter program including a condition for passing the packet or the data. When a packet or data includes designated user identifier information, the electronic device 101 (e.g., the application processor 121 of FIG. 1) according to various embodiments may generate a first packet filter program including a condition for dropping the packet or the data. The packet filter program according to various embodiments may include a Berkely packet filter (BPF). For example, the BPF may include a load instruction, an add instruction, a multiply instruction, a jump instruction, and a divide instruction. The foregoing example of the packet filter program is merely an embodiment, without limiting the present disclosure, and instructions constituting a packet filter program used by those of ordinary skill in the art may be included.

According to various embodiments, the electronic device 101 (e.g., the application processor 121 of FIG. 1) may convert the generated first packet filter program 330 into a bytecode.

In operation 207, according to various embodiments, the electronic device 101 (e.g., the auxiliary processor 123 or the communication processor 191 of FIG. 1) may identify the first packet filter program 330 generated from the application processor 121. For example, the auxiliary processor 123 or the communication processor 191 may identify the first packet filter program 330 converted into the bytecode.

Operations 205 and 207 may include, for example, an operation in which the application processor 121 of FIG. 1 copies the first packet filter program 330 stored in an address region corresponding to the application processor 121 in an address region of the memory 130 to an address region corresponding to the auxiliary processor 123 or the communication processor 191 in an address region of the memory 130. The auxiliary processor 123 or the communication processor 191 may perform a packet filter operation by using the first packet filter program 330 stored in the address region thereof.

In operation 209, according to various embodiments, the electronic device 101 (e.g., the auxiliary processor 123 or the communication processor 191 of FIG. 1) may filter the packet 341 associated with an application other than the allowed application 310 by using the first packet filter program 330 when the electronic device 101 is in the power saving state. The auxiliary processor 123 or the communication processor 191 according to various embodiments may drop the packet 341 failing to satisfy a condition 331 included in the first packet filter program 330, out of the inbound packets 340 and 341. For example, as shown in FIG. 3, when the inbound packets 340 and 341 include source IP address (e.g., a.a.a.a) and destination IP address (e.g., b.b.b.b), the packet 341 may fail to satisfy the condition 331 included in the first packet filter program 330, such that the auxiliary processor 123 or the communication processor 191 may drop the packet 341. When the packet 340 includes the user identifier 311 based on the first packet filter program 330 including the condition for passing the packet 340 including the designated user identifier 311, the auxiliary processor 123 or the communication processor 191 according to various embodiments may pass the packet 340 to transfer the packet 340 to the application processor 121.

According to various embodiments, the electronic device 101 (e.g., the auxiliary processor 123 or the communication processor 191 of FIG. 1) may filter the packet associated with the disallowed application 310 by using the first packet filter program 330 when the electronic device 101 is in the power saving state. The communication processor 123 or 191 according to various embodiments may drop the packet 341 satisfying the condition included in the first packet filter program 330, out of the inbound packets 340 and 341. For example, when the packet 341 of the inbound packets 340 and 341 includes source IP address and destination IP address, the packet 341 satisfies the condition included in the first packet filter program 330 (e.g., a condition corresponding to a black list), such that the communication processor 123 or 191 may drop the packet 341. When the packet 341 includes the designated user identifier based on the first packet filter program 330 including the condition for dropping the packet 341 including the designated user identifier, the communication processor 123 or 191 according to various embodiments may drop the packet 341 not to transfer the packet 341 to the application processor 121.

In operation 211, the electronic device 101 (e.g., the application processor 121 of FIG. 1) may terminate the power saving state when the designated condition is satisfied. At least one of when the electronic device 101 enters a screen-on state by a user's key input or touch input, when motion of the electronic device 101 is identified by the sensor module 176, or when the electronic device 101 enters a charging state by wireless charging or wired charging, the electronic device 101 may terminate the power saving state. The foregoing example of the electronic device 101 terminating the power saving state is merely an embodiment, without limiting the present disclosure, and an example of the electronic device 101 terminating the power saving state known by those of ordinary skill in the art may also be included.

According to various embodiments, when the power saving state of the electronic device 101 (e.g., the application processor 121 of FIG. 1) is terminated, the electronic device 101 may generate a null filter, and the auxiliary processor 123 or the communication processor 191 identifying the null filter may pass all inbound packets to the application processor 121. According to various embodiments, when the power saving state of the electronic device 101 (e.g., the application processor 121 of FIG. 1) is terminated, the application processor 121, instead of the auxiliary processor 123 or the communication processor 191, may filter the packet, based on the user identifier corresponding to the allowed application or the user identifier corresponding to the disallowed application. According to various embodiments, when the power saving state of the electronic device 101 (e.g., the application processor 121 of FIG. 1) is terminated, the electronic device 101 may identify the network connection information 321 associated with the user identifier 311 from the socket 320 corresponding to the at least one allowed application 310 and filter the packet by using the network connection information 321.

Figure 4:
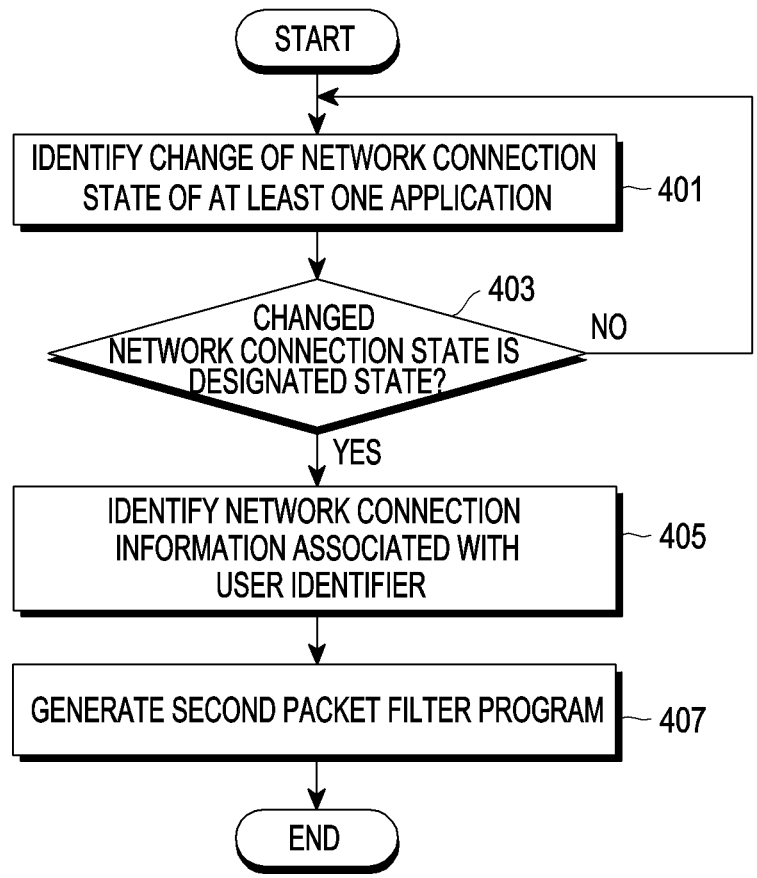
FIG. 4 is a flowchart for describing a method, performed by an electronic device, of generating a filter program, according to various embodiments.
Figure 5:
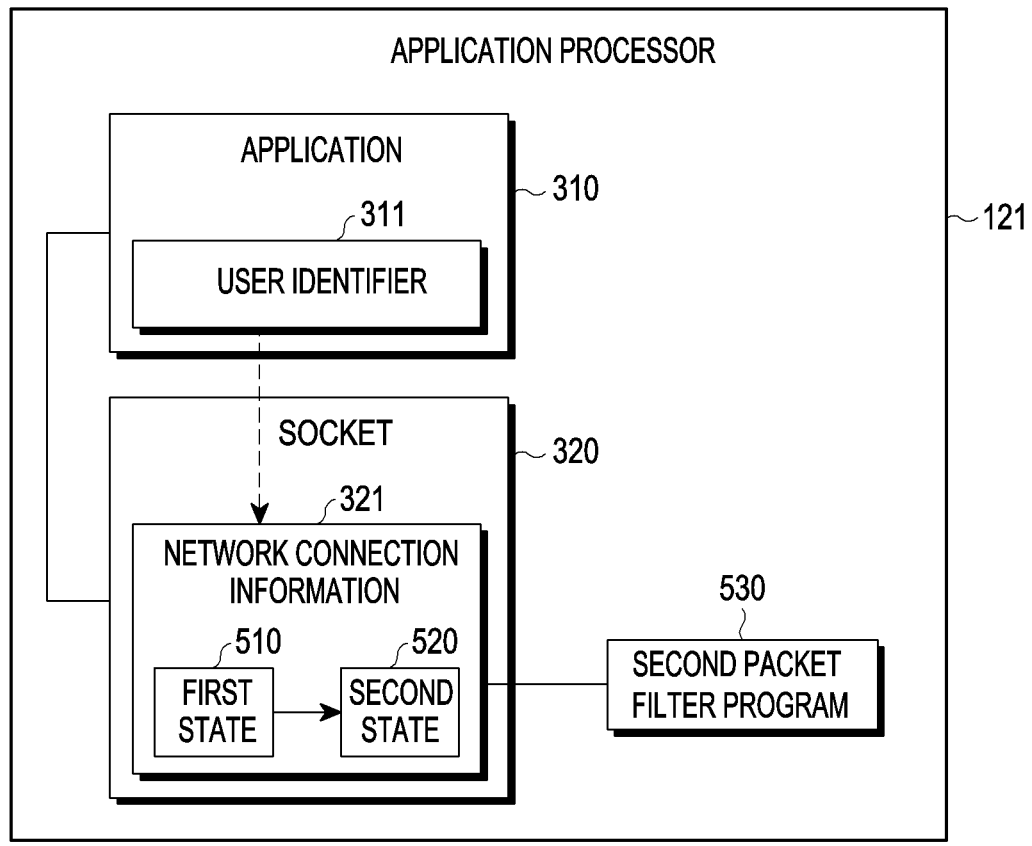
FIG. 5 is a view for describing an example in which an electronic device generates a packet filter program, according to various embodiments.

FIG. 4 is a flowchart for describing a method, performed by the electronic device 101, of generating a packet filter program 530, according to various embodiments. FIG. 5 is a view for describing an example in which the electronic device 101 generates the packet filter program 530, according to various embodiments.

Referring to FIGS. 4 and 5, in operation 401, according to various embodiments, the electronic device 101 (e.g., the application processor 121 of FIG. 1) may identify a change of a network connection state of the at least one allowed application 310 during execution of packet filtering with the first packet filter program 330 in the power saving state. For example, the electronic device 101 may determine whether a TCP connection state of the application 310 changes to one of CLOSED, LISTEN, SYN-RECEIVED, ESTABLISHED, FIN-WAIT-1, FIN-WAIT-2, CLOSING, or TIME-WAIT. According to various embodiments, the network connection state may include network connection states of various protocols, without being limited to the TCP connection state.

In operation 403, according to various embodiments, the electronic device 101 (e.g., the application processor 121 of FIG. 1) may determine whether the changed network connection state is a designated state for adding a condition of the packet filter program or is a designated state for deleting the condition of the packet filter program. For example, the electronic device 101 may identify the current TCP connection state as a 'CLOSED' state and determine that the TCP connection state changes from the 'CLOSED' state to a 'LISTEN' state for adding the condition of the packet filter program. In another example, the electronic device 101 may identify the current TCP connection state as a 'CLOSING' state and determine that the TCP connection state changes from the 'CLOSING' state to a 'TIME-WAIT' state for deleting the condition of the packet filter program. According to various embodiments, the designated state for adding the condition of the packet filter program or the designated state for deleting the condition of the packet filter program is not limited to the foregoing example, and may be variously determined by a designer.

In operation 405, according to various embodiments, when the changed network connection state is the designated state, the electronic device 101 (e.g., the application processor 121 of FIG. 1) may identify the network connection information 321 associated with the user identifier 311 corresponding to the designated-state application 310 from the socket 320 corresponding to the designated-state application 310. For example, as shown in FIG. 5, when the network connection state of the application 310 changes from a first state 510 to a second state 520 which is the designated state, the electronic device 101 may identify the network connection information 321 associated with the user identifier 311 from the socket 320. According to various embodiments, when the changed network connection state is not the designated state, the electronic device 101 may filter an inbound packet by using the existing used first packet filter program 330, without newly generating the second packet filter program 530. In this case, the electronic device 101 may return to operation 401 and identify a change of the network connection state of the at least one allowed application 310.

In operation 407, according to various embodiments, the electronic device 101 (e.g., the application processor 121 of FIG. 1) may generate the second packet filter program 530 by using the network connection information 321 associated with the user identifier 311 corresponding to the application 310 having the network connection state being the designated state. When the network connection state of the application 310 reaches the designated state for adding the condition of the packet filter program, the electronic device 101 according to various embodiments may generate the second packet filter program 530 by adding the condition including the network connection information 321 associated with the user identifier 311 corresponding to the designated-state application 310 to the first packet filter program 330. For example, by adding a condition for passing a packet including an IP source address and an IP destination address in the network connection information 321 associated with the user identifier 311 to the first packet program 330, the second packet filter program 530 may be generated. When the network connection state of the application 310 reaches the designated state for deleting the condition of the packet filter program, the electronic device 101 according to various embodiments may generate the second packet filter program 530 by deleting the condition including the network connection information 321 associated with the user identifier 311 corresponding to the designated-state application 310 from the first packet filter program 330. For example, by deleting the condition for passing a packet including an IP source address and an IP destination address in the network connection information 321 associated with the user identifier 311 from the first packet program 330, the second packet filter program 530 may be generated.

According to various embodiments, the electronic device 101 (e.g., the auxiliary processor 123 or the communication processor 191 of FIG. 1) may identify the second packet filter program 530 converted into the bytecode. The electronic device 101 (e.g., the auxiliary processor 123 or the communication processor 191 of FIG. 1) according to various embodiments may filter at least one packet associated with an application other than at least one allowed application or at least one packet associated with at least one disallowed application, by using the second packet filter program 530 when the electronic device 101 is in the power saving state. The electronic device 101 according to various embodiments may use an operation of filtering a packet, described in operation 209 of FIG. 2.

Figure 6:
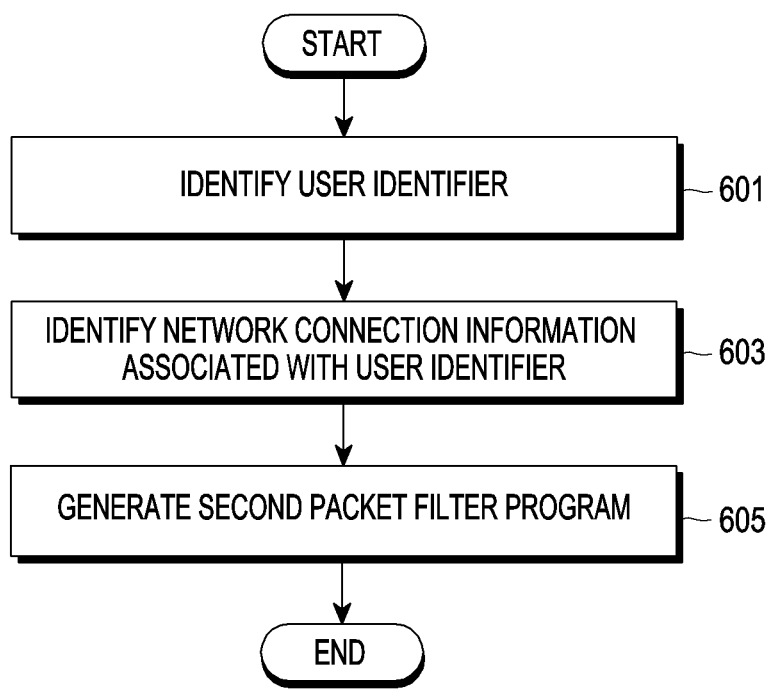
FIG. 6 is a flowchart for describing a method, performed by an electronic device, of generating a packet filter program, according to various embodiments.
Figure 7:
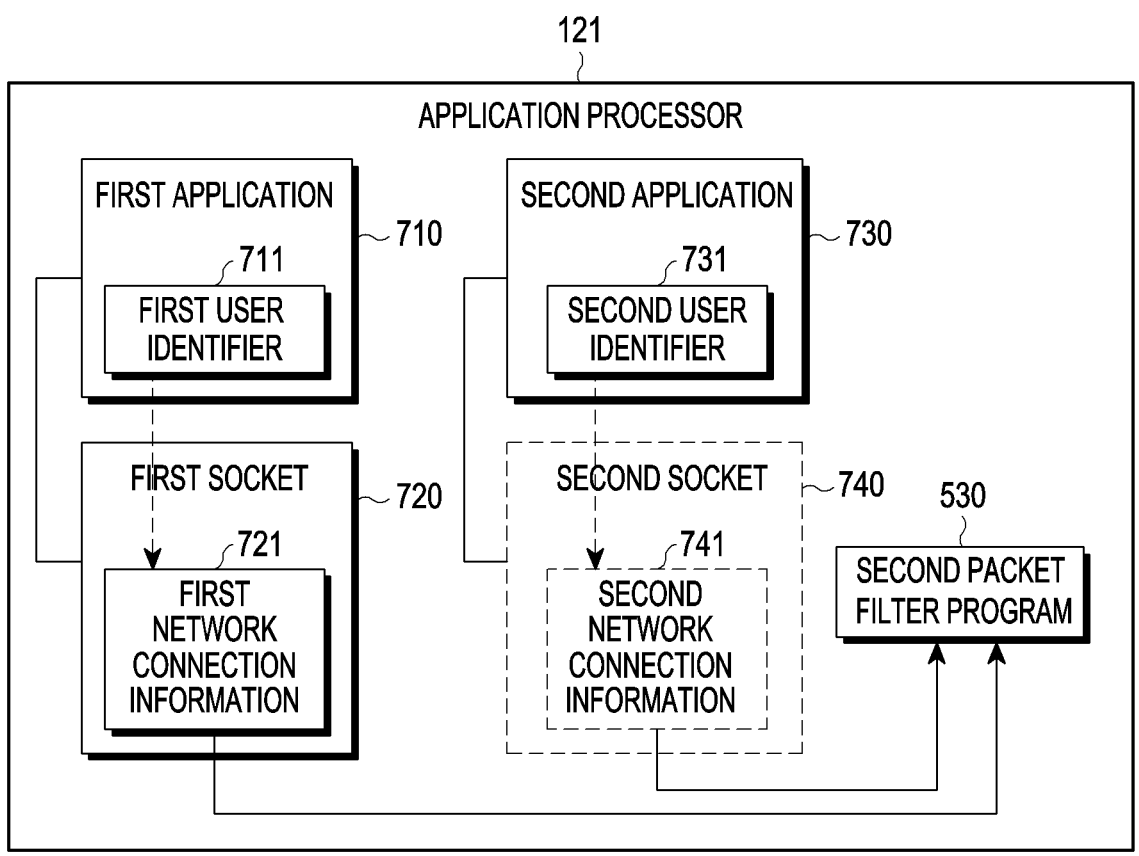
FIG. 7 is a view for describing an example in which an electronic device generates a packet filter program, according to various embodiments.

FIG. 6 is a flowchart for describing a method, performed by the electronic device 101, of generating the packet filter program 530, according to various embodiments. FIG. 7 is a view for describing an example in which the electronic device 101 generates the packet filter program 530, according to various embodiments.

Referring to FIGS. 6 and 7, in operation 601, according to various embodiments, the electronic device 101 (e.g., the application processor 121 of FIG. 1) may identify a first user identifier 711 of an allowed first application 710 when network connection of the allowed first application 710 is requested during execution of packet filtering with the first packet filter program 330 in the power saving state. For example, as shown in FIG. 7, when the pre-designated first application 710 to perform data communication in the power saving state requests connection to the network to perform the data communication, the electronic device 101 may identify the first user identifier 711 of the pre-designated first application 710. According to various embodiments, the electronic device 101 (e.g., the application processor 121 of FIG. 1) may identify a second user identifier 731 corresponding to an allowed second application 730 when network connection of the allowed second application 730 is released during execution of packet filtering with the first packet filter program 330 in the power saving state. For example, as shown in FIG. 7, when the second application 730 in communication releases network connection to terminate the data communication in the power saving state, the electronic device 101 may identify the second user identifier 731 of the second application 730 for which network connection is released.

In operation 603, according to various embodiments, the electronic device 101 (e.g., the application processor 121 of FIG. 1) may identify first network connection information 721 associated with the first user identifier 711 from a socket corresponding to the allowed first application 710. For example, as shown in FIG. 7, when network connection of the first application 710 is requested, a first socket 720 corresponding to the first application may be opened. The electronic device 101 may identify the first network connection information 721 associated with the first user identifier 711 from the first socket 720 corresponding to the first application 710 for which network connection is requested. According to various embodiments, the electronic device 101 may identify second network connection information 741 associated with a second user identifier 731 from a socket corresponding to the allowed second application 730. For example, as shown in FIG. 7, when network connection of the second application 730 is released, a second socket 740 corresponding to the second application may be closed.

The electronic device 101 may identify the second network connection information 741 associated with the second user identifier 731 from the second socket 720 corresponding to the second application 730 for which network connection is released. The first network connection information 721 or the second network connection information 741 may include at least one of an IP version, an IP source address, an IP destination address, a protocol, a network connection state, a TCP source port, a TCP destination port, or a hash value identifying network connection.

In operation 605, according to various embodiments, the electronic device 101 (e.g., the application processor 121 of FIG. 1) may generate the second packet filter program 530 by using the first network connection information 721 or the second network connection information 741.

The electronic device 101 according to various embodiments may generate the second packet filter program 530, by adding a condition including the first network connection information 721 associated with the first user identifier 711 corresponding to the first application 710 for which network connection is requested. For example, by adding a condition for passing a packet including an IP source address and an IP destination address in the first network connection information 721 associated with the first user identifier 711 to the first packet program 330, the electronic device 101 may generate the second packet filter program 530.

The electronic device 101 according to various embodiments may generate the second packet filter program 530, by deleting a condition including the second network connection information 741 associated with the second user identifier 731 corresponding to the second application 730 for which network connection is released. For example, by deleting a condition for passing a packet including an IP source address and an IP destination address in the second network connection information 741 associated with the second user identifier 731 from the first packet program 330, the electronic device 101 may generate the second packet filter program 530.

According to various embodiments, the electronic device 101 (e.g., the auxiliary processor 123 or the communication processor 191 of FIG. 1) may identify the second packet filter program 530 converted into the bytecode. The electronic device 101 (e.g., the auxiliary processor 123 or the communication processor 191 of FIG. 1) according to various embodiments may filter at least one packet associated with an application other than at least one allowed application or at least one packet associated with at least one disallowed application, by using the second packet filter program 530 when the electronic device 101 is in the power saving state. The electronic device 101 according to various embodiments may use an operation of filtering a packet, described in operation 209 of FIG. 2.

Figure 8:
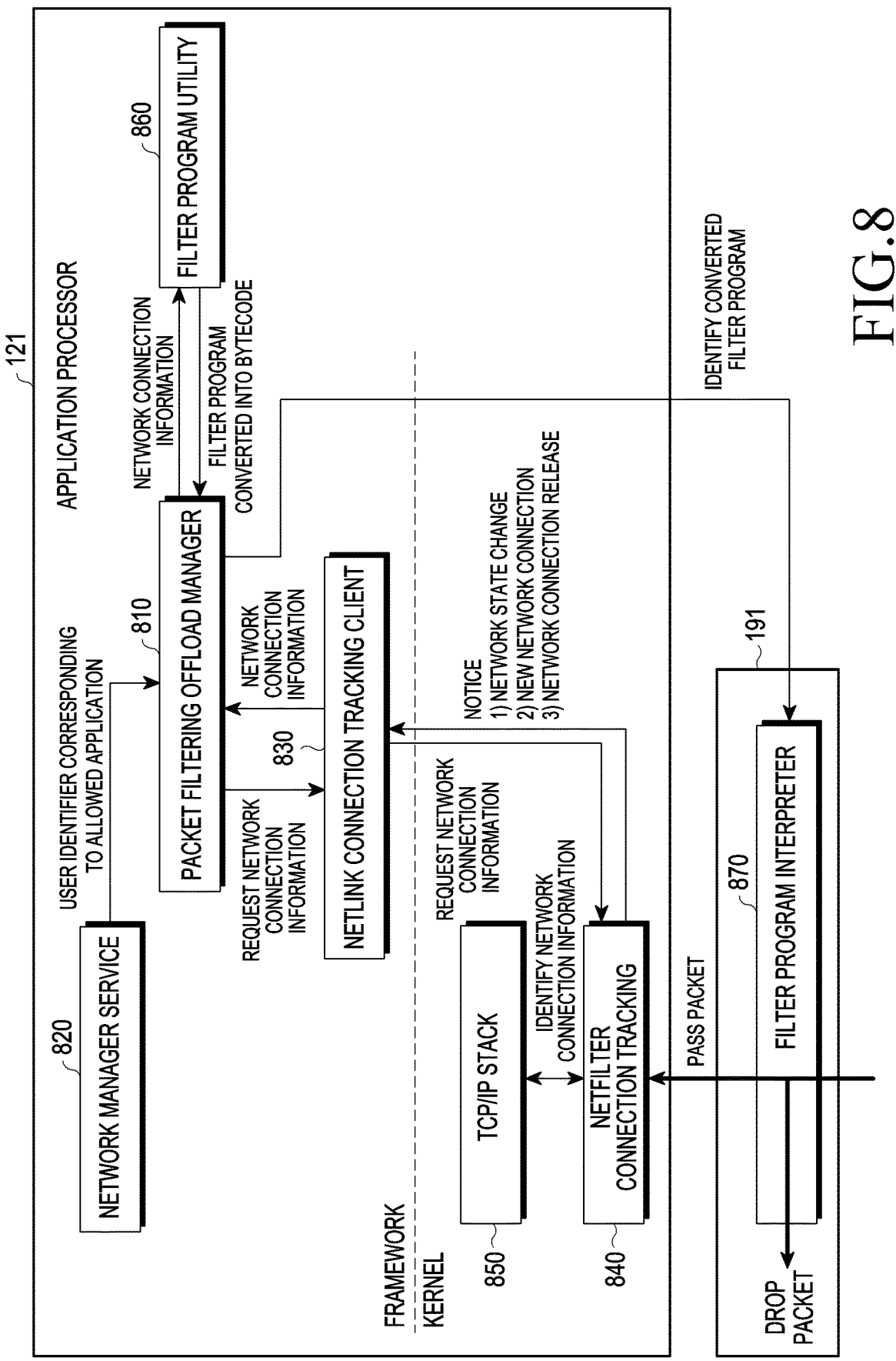
FIG. 8 is a view for describing an example in which an electronic device generates and executes a packet filter program, according to various embodiments.

FIG. 8 is a view for describing an example in which the electronic device 101 generates and executes a packet filter program, according to various embodiments.

According to various embodiments, the application processor 121 may include a packet filtering offload manager module 810, a network manager service module 820, a netlink connection tracking client module 830, a netfilter connection tracking module 840, a TCP/IP stack module 850, and a filter program utility module 860, and the auxiliary processor 123 or the communication processor 191 may include a filter program interpreter module 870.

According to various embodiments, when the electronic device 101 enters the power saving state, the packet filtering offload manager module 810 may receive a list including at least one user identifier corresponding to at least one allowed application from the network manager service module 820. The allowed application may include a pre-designated application to perform data communication in the power saving state or an application being in communication in the power saving state. The packet filtering offload manager module 810 may identify at least one user identifier from the received list. The packet filtering offload manager module 810 may request network connection information associated with a user identifier to the netlink connection tracking client module 830, and may receive the requested network connection information from the netlink connection tracking client module 830. When the electronic device 101 enters the power saving state, the packet filtering offload manager module 810 may register connection tracking events to receive a notification regarding a network state, and when a particular event occurs, the packet filtering offload manager module 810 receive a notification regarding the particular event from the netlink connection tracking client module 830. For example, the packet filtering offload manager module 810 may receive a notification regarding a network state change when an event occurs in the netlink connection tracking client module 830 in which a network state of an allowed application changes into a pre-designated state, may receive a notification regarding a network connection request when an event occurs where new network connection is requested, or may receive a notification regarding network connection release when an event occurs in which network connection is released. The packet filtering offload manager module 810 may identify a user identifier corresponding to an application associated with a corresponding notification and then request network connection information associated with the user identifier. According to various embodiments, the notification regarding the network state may include a notice regarding the network state and network connection information regarding the network state.

The packet filtering offload manager module 810 may transmit network connection information associated with a user identifier to the filter program utility module 860 to generate a packet filter program or may receive a packet filter program converted into a bytecode from the filter program utility module 860.

According to various embodiments, the netlink connection tracking client module 830 may operate in a framework level, request network connection information associated with a user identifier to the netfilter connection tracking module 840 operating in a kernel level, and receive the requested network connection information from the netlink connection tracking module 840. When a network state of an allowed application is changed into a pre-designated state, new network connection is requested, or network connection is released, the netlink connection tracking client module 830 may receive a notification regarding a network state and transmit the notification to the packet filtering offload manager module 810. According to various embodiments, the notification regarding the network state may include network connection information regarding the network state.

The netfilter connection tracking module 840 may identify network connection information associated with a user identifier corresponding to an allowed application existing in the TCP/IP stack module 850 from a socket corresponding to the allowed application, and transmit the identified network connection information to the netlink connection tracking client module 830. The netfilter connection tracking module 840 may transmit a notification to the netlink connection tracking client module 830 when the network state of the allowed application is changed, new network connection is requested, or network connection is released.

The netfilter connection tracking module 840 may identify network connection information from a socket existing in the TCP/IP stack module 850, in which the network connection information may include at least one of an IP version, an IP source address, an IP destination address, a protocol, a network connection state, a TCP source port, a TCP destination port, or a hash value identifying network connection.

When receiving network connection information associated with a user identifier from the packet filtering offload manager module 810, the filter program utility module 860 may generate a packet filter program by using the network connection information. For example, the filter program utility module 860 may generate a packet filter program including a condition for passing a packet including designated information, source IP address information (e.g., x.x.x.x) and destination IP address (e.g., y.y.y.y) of the network connection information associated with the user identifier. The filter program utility module 860 may convert the generated packet filter program into the bytecode and transmit the packet filter program converted into the bytecode to the packet filtering offload manager module 810.

The filter program interpreter module 870 may identify the packet filter program generated from the packet filtering offload manager module 810 and converted into the bytecode. The filter program interpreter module 870 may filter a packet associated with an application other than the allowed application, by using the packet filter program. For example, when an inbound packet fails to satisfy a condition included in the packet filter program, the filter program interpreter module 870 may drop the inbound packet. When the power saving state of the electronic device 101 is terminated, the filter program interpreter module 870 may identify a null filter generated from the packet filtering offload manager module 810 and pass all inbound packets to the application processor 121 based on the null filter.

Each module described with reference to FIG. 8 shows an embodiment of a module that may be used in a kernel and a framework, and is not limited to the example.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, the electronic device 101 may include the communication processor 123 or 191, the application processor 121 operatively connected with the communication processor 123 or 191, and the at least one memory 130, in which the at least one memory 130 stores instructions configured to, when executed, cause the application processor 121 to identify a user identifier (UID) corresponding to at least one allowed application or at least one disallowed application when the electronic device 191 enters a power saving state and to generate a first packet filter program including at least one condition for filtering a packet, based on the user identifier, and the at least one memory 130 stores instructions configured to, when executed, cause the communication processor 123 or 191 to identify the first packet filter program generated from the application processor 121 and to filter at least one packet associated with an application other than the at least one allowed application or at least one packet associated with the at least one disallowed application by using the first packet filter program, when the electronic device 101 is in the power saving state.

According to various embodiments, the instructions may be configured to cause the application processor 121 to identify network connection information associated with the user identifier from a socket corresponding to the at least one allowed application or the at least one disallowed application and to generate the first packet filter program by using the network connection information.

According to various embodiments, when a packet identified by the communication processor 123 or 191 includes at least one designated information of the network connection information, the first packet filter program may include a condition for passing the packet.

According to various embodiments, the network connection information may include at least one of an Internet protocol (IP) version, an IP source address, an IP destination address, a protocol, a network connection state, a transmission control protocol (TCP) source port, a TCP destination port, or a hash value identifying network connection.

According to various embodiments, the at least one allowed application may include at least one of a pre-designated application to perform data communication in the power saving state or an application performing data communication in the power saving state.

According to various embodiments, the instructions may be configured to cause the application processor to convert the first packet filter program into a bytecode, and the communication processor to identify the first packet filter program converted into the bytecode.

According to various embodiments, the instructions may be configured to cause the application processor to identify a change of a network connection state of the at least one allowed application in the power saving state, to identify, when the changed network connection state is a designated state, network connection information associated with a user identifier corresponding to an application in the designated state from a socket corresponding to the application in the designated state, and to generate a second packet filter program by using the network connection information.

According to various embodiments, the instructions may be configured to cause the communication processor 123 or 191 to identify the second packet filter program generated from the application processor and to filter at least one packet associated with an application other than the at least one allowed application or at least one packet associated with the at least one disallowed application by using the second packet filter program, when the electronic device is in the power saving state.

According to various embodiments, the instructions may be configured to cause the application processor 121 to identify, when network connection of an allowed first application is requested, a first user identifier corresponding to the allowed first application, in the power saving state, or identify, when network connection of an allowed second application is released, a second user identifier corresponding to the allowed second application, in the power saving state, to identify first network connection information associated with the first user identifier from a socket corresponding to the allowed first application or second network connection information associated with the second user identifier from a socket corresponding to the allowed second application, and to generate a second packet filter program by using the first network connection information or the second network connection information.

According to various embodiments, the instructions may be configured to cause the application processor 121 to generate a null filter when the power saving state of the electronic device is terminated.

According to various embodiments, an operation method of the electronic device 101 which filters a packet includes identifying, by the application processor 121, a user identifier (UID) corresponding to at least one allowed application or at least one disallowed application when the electronic device 101 enters a power saving state, generating, by the application processor 121, a first packet filter program including at least one condition for filtering a packet, based on the user identifier, identifying, by the communication processor 123 or 191, the first packet filter program generated from the application processor 121, and filtering, by the communication processor 123 or 191, at least one packet associated with an application other than the at least one allowed application or at least one packet associated with the at least one disallowed application, by using the first packet filter program, when the electronic device 101 is in the power saving state.

According to various embodiments, the generating of the first packet filter program may include identifying network connection information associated with the user identifier from a socket corresponding to the at least one allowed application or the at least one disallowed application and generating the first packet filter program by using the network connection information.

According to various embodiments, the operation method of the electronic device 101 which filters a packet may further include converting, by the application processor 121, the first packet filter program into a bytecode, and identifying, by the communication processor 123 or 191, the first packet filter program converted into the bytecode.

According to various embodiments, the operation method of the electronic device 101 which filters a packet may further include identifying a change of a network connection state of the at least one allowed application in the power saving state, identifying, when the changed network connection state is a designated state, network connection information associated with a user identifier corresponding to an application in the designated state from a socket corresponding to the application in the designated state, and generating a second packet filter program by using the network connection information.

According to various embodiments, the operation method of the electronic device 101 which filters a packet may further include identifying the second packet filter program generated from the application processor 121 and filtering at least one packet associated with an application other than the at least one allowed application or at least one packet associated with the at least one disallowed application by using the second packet filter program, when the electronic device 101 is in the power saving state.

According to various embodiments, the operation method of the electronic device 101 which filters a packet may further include identifying, when network connection of an allowed first application is requested, a first user identifier corresponding to the allowed first application, in the power saving state, or identifying, when network connection of an allowed second application is released, a second user identifier corresponding to the allowed second application, in the power saving state, identifying first network connection information associated with the first user identifier from a socket corresponding to the allowed first application or second network connection information associated with the second user identifier from a socket corresponding to the allowed second application, and generating a second packet filter program by using the first network connection information or the second network connection information.

According to various embodiments, in a computer-readable recording medium having recorded thereon a program for executing an operation method of the electronic device 101 including the communication processor 123 or 191, the application processor 121 operatively connected with the communication processor 123 or 191, and the memory 130, the operation method includes identifying, by the application processor 121, a user identifier (UID) corresponding to at least one allowed application or at least one disallowed application when the electronic device 101 enters a power saving state, generating, by the application processor 121, a first packet filter program including at least one condition for filtering a packet, based on the user identifier, identifying, by the communication processor 123 or 191, the first packet filter program generated from the application processor 121, and filtering, by the communication processor 123 or 191, at least one packet associated with an application other than the at least one allowed application or at least one packet associated with the at least one disallowed application, by using the first packet filter program, when the electronic device 101 is in the power saving state.

What is claimed is:

1. An electronic device comprising:
   a communication processor;
   an application processor operatively connected with the communication processor; and
   at least one memory,
   wherein the at least one memory stores instructions configured to, when executed, cause the application processor to:
      identify a user identifier (UID) corresponding to at least one allowed application or at least one disallowed application when the electronic device enters a power saving state; and
      generate a first packet filter program comprising at least one condition for filtering a packet, based on the user identifier, and
   the at least one memory stores instructions configured to, when executed, cause the communication processor to:
      receive at least one packet from an external electronic device;
      identify whether the electronic device is in the power saving state;
      based on identifying that the electronic device is in the power saving state, identify the first packet filter program generated from the application processor;
      filter a packet associated with an application other than the at least one allowed application or at least one a packet associated with the at least one disallowed application among the at least one packet, by using the first packet filter program;
      transmit a packet associated with the at least one allowed application among the at least one packet to the application processor, by using the first packet filter program;
      based on identifying that the electronic device is not in the power saving state, transmit the at least one packet to the application processor; and
   wherein the instructions are configured to cause the application processor to filter the at least one packet which is transmitted by the communication processor when the electronic device in not in the power saving state.

2. The electronic device of claim 1, wherein the instructions are configured to cause the application processor to:
   identify network connection information associated with the user identifier from a socket corresponding to the at least one allowed application or the at least one disallowed application; and
   generate the first packet filter program by using the network connection information.

3. The electronic device of claim 2, wherein when a packet identified by the communication processor comprises at least one designated information of the network connection information, the first packet filter program comprises a condition for passing the packet.

4. The electronic device of claim 3, wherein the network connection information comprises at least one of an Internet protocol (IP) version, an IP source address, an IP destination address, a protocol, a network connection state, a transmission control protocol (TCP) source port, a TCP destination port, or a hash value identifying network connection.

5. The electronic device of claim 1, wherein the at least one allowed application comprises at least one of a pre-designated application to perform data communication in the power saving state or an application performing data communication in the power saving state.

6. The electronic device of claim 1, wherein the instructions are configured to cause the application processor to convert the first packet filter program into a bytecode, and the communication processor to identify the first packet filter program converted into the bytecode.

7. The electronic device of claim 1, wherein the instructions are configured to cause the application processor to:
   identify a change of a network connection state of the at least one allowed application in the power saving state;
   identify, when the changed network connection state is a designated state, network connection information associated with a user identifier corresponding to an application in the designated state from a socket corresponding to the application in the designated state; and
   generate a second packet filter program by using the network connection information.

8. The electronic device of claim 7, wherein the instructions are configured to cause the communication processor to:
   identify the second packet filter program generated from the application processor; and filter a packet associated with an application other than the at least one allowed application or a packet associated with the at least one disallowed application by using the second packet filter program, when the electronic device is in the power saving state.

9. The electronic device of claim 1, wherein the instructions are configured to cause the application processor to:
identify, when network connection of an allowed first application is requested, a first user identifier corresponding to the allowed first application, in the power saving state, or identify, when network connection of an allowed second application is released, a second user identifier corresponding to the allowed second application, in the power saving state;
identify first network connection information associated with the first user identifier from a socket corresponding to the allowed first application or second network connection information associated with the second user identifier from a socket corresponding to the allowed second application; and
generate a second packet filter program by using the first network connection information or the second network connection information.

10. The electronic device of claim 1, wherein the instructions are configured to cause the application processor to generate a null filter when the power saving state of the electronic device is terminated.

11. An operation method of an electronic device which filters a packet, the operation method comprising:
identifying, by an application processor, a user identifier (UID) corresponding to at least one allowed application or at least one disallowed application when the electronic device enters a power saving state;
generating, by the application processor, a first packet filter program comprising at least one condition for filtering a packet, based on the user identifier;
receiving, by a communication processor, at least one packet from an external electronic device;
identifying, by the communication processor, whether the electronic device is in the power saving state;
based on identifying that the electronic device is in the power saving state, identifying, by the communication processor, the first packet filter program generated from the application processor;
filtering, by the communication processor, a packet associated with an application other than the at least one allowed application or a packet associated with the at least one disallowed application among the at least one packet, by using the first packet filter program;
transmit a packet associated with the at least one allowed application among the at least one packet to the application processor, by using the first packet filter program;
based on identifying that the electronic device is not in the power saving state, transmitting, by the communication processor, the at least one packet to the application processor; and
filtering, by the application processor, the at least one packet which is transmitted by the communication processor when the electronic device in not in the power saving state.

12. The operation method of claim 11, wherein the generating of the first packet filter program comprises:
identifying network connection information associated with the user identifier from a socket corresponding to the at least one allowed application or the at least one disallowed application; and
generating the first packet filter program by using the network connection information.

13. The operation method of claim 12, wherein when a packet identified by the communication processor comprises at least one designated information of the network connection information, the first packet filter program comprises a condition for passing the packet.

14. The operation method of claim 13, wherein the network connection information comprises at least one of an Internet protocol (IP) version, an IP source address, an IP destination address, a protocol, a network connection state, a transmission control protocol (TCP) source port, a TCP destination port, or a hash value identifying network connection.

15. The operation method of claim 11, wherein the at least one allowed application comprises at least one of a pre-designated application to perform data communication in the power saving state or an application performing data communication in the power saving state.

* * * * *